Figure 1:
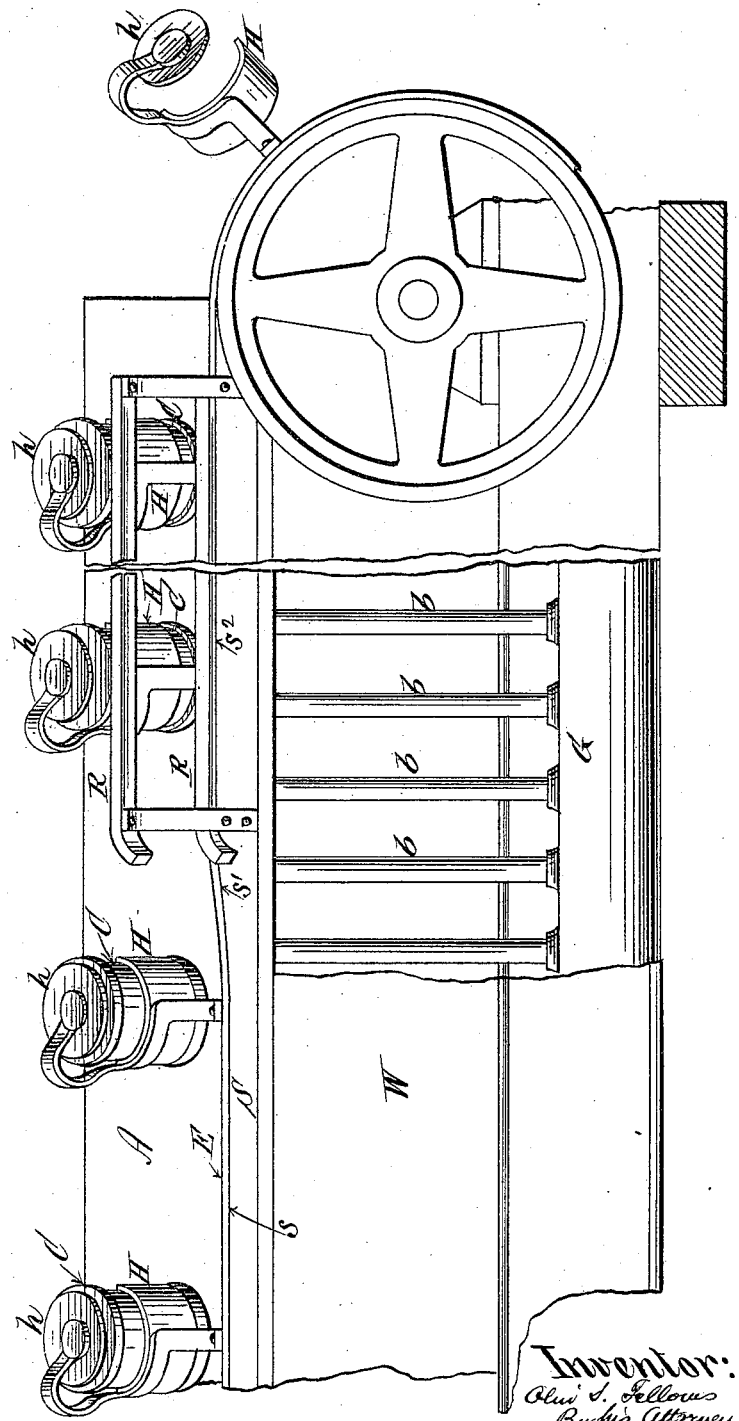

(No Model.) 3 Sheets—Sheet 1.

O. S. FELLOWS.
SOLDERING MACHINE.

No. 575,061. Patented Jan. 12, 1897.

Witnesses:
D. W. Gardner.
Louis N. Rowley.

Inventor:
Olin S. Fellows
By his Attorney
George William Miatt (No Model.) 3 Sheets—Sheet 2.

O. S. FELLOWS.
SOLDERING MACHINE.

No. 575,061. Patented Jan. 12, 1897.

Witnesses:
D. W. Gardner.
Louis A. Rowley.

Inventor:
Oliv S. Fellows
By his attorney
George William Miatt (No Model.) 3 Sheets—Sheet 3.
O. S. FELLOWS.
SOLDERING MACHINE.
No. 575,061. Patented Jan. 12, 1897.
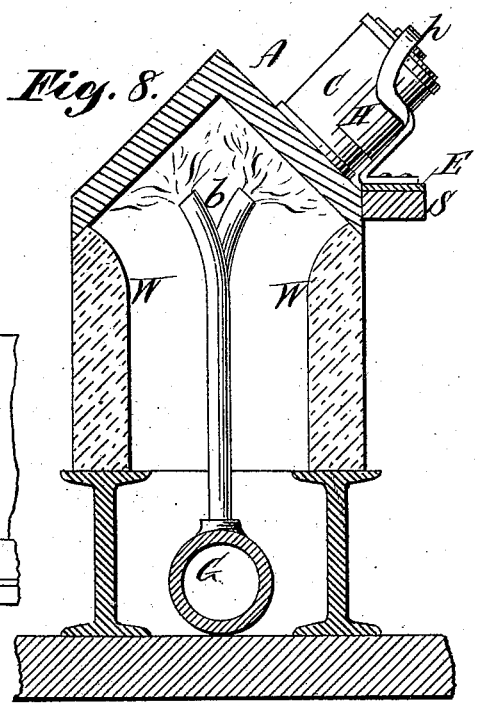

UNITED STATES PATENT OFFICE.

OLIN S. FELLOWS, OF MIDDLETOWN, NEW YORK.

SOLDERING-MACHINE.

SPECIFICATION forming part of Letters Patent No. 575,061, dated January 12, 1897.

Application filed April 28, 1896. Serial No. 589,368. (No model.)

*To all whom it may concern:*

Be it known that I, OLIN S. FELLOWS, a citizen of the United States, residing at Middletown, in the county of Orange and State of New York, have invented certain new and useful Improvements in Soldering-Machines, of which the following is a specification sufficient to enable others skilled in the art to which the invention appertains to make and use the same.

My improvements relate to the form of soldering-machine described in my Patent No. 557,366, dated March 31, 1896, in which the unsealed can-joints provided with an appropriate quantity of solid solder are passed over a metallic soldering table or bar heated to a prescribed degree sufficient to melt the solder without vaporizing it, so as to cause the solder to seal the joints when cool. In this form of soldering-machine it is desirable that the heating table or bar be inclined, so that the solid solder dropped into the can resting thereon will naturally take position at the angle between can-body and end plate and at the lowest point. In order to distribute the solder along the joint, it is necessary to rotate the can upon its longitudinal axis, and this has been done heretofore. I have found, however, by investigation and experiment that in order to attain the best and most positive uniform results it is desirable that the solder be thoroughly melted and reduced to the liquid state prior to the rotation of the can, as otherwise it is apt to be carried around with the can and to run across the end plate as it melts, wasting and rendering the joint imperfect.

The distinguishing feature of my present invention is the advancing of the can along the heated table or bar without rotation, and preferably under pressure, for a distance sufficient to insure the reduction of the solder to a liquid state and the subsequent rotation of the can upon the heated table or bar to bring all parts of the joint into contact with the liquid solder, which remains at the lowest point in the can until absorbed by the joint; and the invention consists in a soldering-machine having an inclined heating table or bar, means for passing a can over the surface of the said heating table or bar, either with or without pressure, and means for thereafter rotating the can over the said heating-surface, substantially as hereinafter set forth.

By my invention I attain more perfect and uniform results than heretofore in a machine which is continuous in operation, so that cans can be fed in rapidly, the length of the heating-surface, temperature, and speed of advancement, &c., being regulated to the requirements of the number of cans to be treated in a given time. Thus provision may be made for running fifty thousand or more cans through in a day, a result which would be impossible were the cans held stationary on the heating-surface until the solder was reduced to the liquid state.

In the accompanying drawings a portion only of the soldering apparatus is shown sufficient to illustrate the essential feature of my invention.

Figure 5:
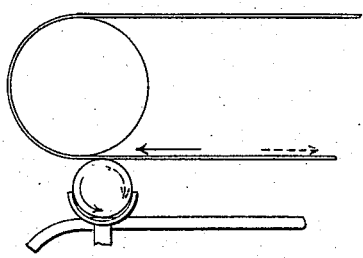
Figure 6:
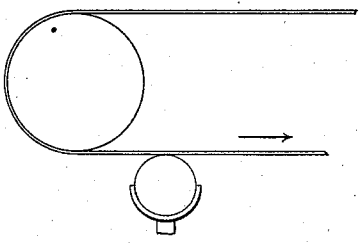
Figure 2:
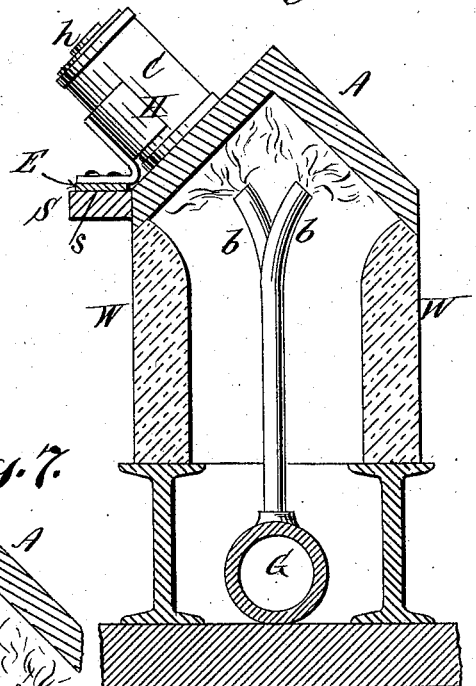
Figure 7:
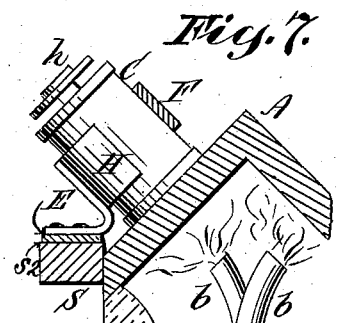
Figures 3, 4:
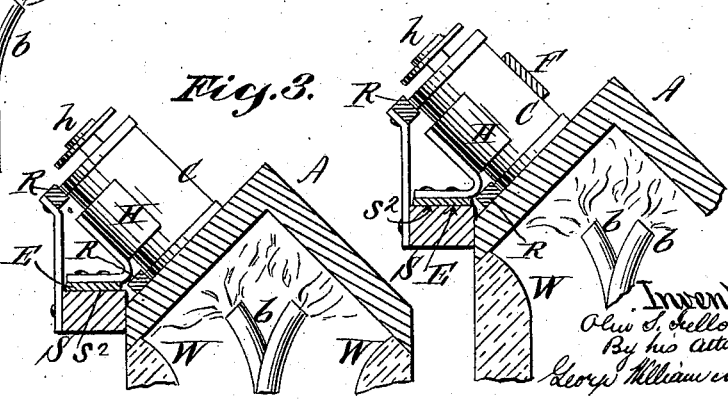

Figure 1 is an elevation, parts being broken away. Fig. 2 is a transverse section showing a can pressed down upon the heating-table; Fig. 3, a similar view showing the can relieved from pressure; Fig. 4, a similar view illustrating means for positively rotating the can on the rails; Fig. 5, a diagrammatic representation of the same feature; Fig. 6, a diagrammatic representation of means for rotating the can in its cup or holder; Fig. 7, a transverse sectional view illustrating the same; Fig. 8, a transverse section looking toward the rear end of the heating-table; Fig. 9, a top view of the can and holder, &c., taken on plane parallel to heating-surface; Fig. 10, a side elevation of holder, &c., taken on plane at right angles to heating-surface.

The soldering-table A may be heated and its temperature regulated in any desired or convenient manner, as by the means set forth in my patent hereinbefore referred to. It is preferably of the double or rectangular form, as shown in the accompanying drawings, although a single inclined table may be used. When of the double form shown, the means for carrying out my present invention are duplicated on opposite sides of the apparatus, a receiving, reversing, and transferring device being situated at the end to change the cans from one table to the other; but as such devices are old and well known I have not herein shown one, but have confined myself to the essential features for giving practical effect to my invention in connection with a single heating-table or one side of a double table.

In the drawings, G represents the gas and air supply pipe, feeding the burners *b*.

W W are walls of fire-brick or other suitable material.

Each can C is deposited in a holder H at one end of the apparatus, each holder being attached to and traveling with an endless chain or belt E, passing over a way or support S, extending longitudinally at or near the lower edge of the table A.

Attached to or forming a part of each holder H is an end clamp or presser-foot $h$, which, while the holder H is traveling over the lower horizontal level $s$ of the supporting-way S, rests against the upper end of the can C and presses the lower end of the latter down firmly against the surface of the heating-table A and prevents its turning thereon while being drawn over it. When the incline $s'$ of the supporting-way S is reached, the elevation of the belt to the higher level $s^2$ of said supporting-way S raises the presser-foot $h$ from the end of the can, and the latter is free to rotate on its longitudinal axis. By the use of the presser-foot $h$ I not only prevent the rotation of the can, but also by reason of the close contact thereby attained between the heating-surface and can end plate reduce the time necessary to effect the melting of the solid solder introduced into the can.

The use of the presser-foot $h$, while desirable, is not absolutely essential, since the frictional contact of the side of the can-body with the inner surface of the holder H may be relied upon to prevent rotation of the can, especially when of large size, or the cans may be pressed downward upon and against the heating-table by other means, as by a belt traveling in unison with the conveyer E.

The rotation of the cans may be effected by various mechanical expedients. In Figs. 1 to 5, inclusive, the elevation of the conveyer E by the incline $s'$ to the upper level $s^2$ not only raises the presser-foot $h$, but also deposits the can upon the rails R R, along which it will roll by reason of frictional contact therewith, aided or supplemented, if desired, by a belt F above moving slowly in the opposite direction to that of the conveyer or in the same direction at a slightly-increased speed, or the rails R R may be dispensed with and the can rotated in and upon its holder H by means of an upper belt, as illustrated in Figs. 6 and 7. In either case the result will be to distribute the melted solder along the joint between the end of the can-body and the flange of the end plate, which is the object sought to be attained.

I have herein shown and described my invention as applied to the manufacture of cans of cylindrical form in cross-section, although it may obviously be adapted to the manufacture of cans of other forms in cross-section without departing from the spirit and intent of my invention.

What I claim as my invention, and desire to secure by Letters Patent, is—

1. In apparatus for soldering the end plates of sheet-metal cans to the can-bodies with solder applied in solid form, the combination of a metallic heating-table for the cans, means for heating said metallic table, means for advancing said cans along said heating-table without rotation, and means for rotating the said cans on said heating-table, substantially in the manner and for the purpose described.

2. In apparatus for soldering the end plates of sheet-metal cans to the can-bodies with solder applied in solid form, the combination of a metallic heating-table for the cans, means for heating said metallic table, means for pressing said cans down upon the heating-table and advancing them thereon while under such pressure, and means for rotating the said cans on said heating-table, substantially in the manner and for the purpose described.

3. In apparatus for soldering the end plates of sheet-metal cans to their can-bodies with solder applied in solid form, the combination of the metallic heating-table, means for heating said metallic table, the endless conveyer E, traveling over the support S, and provided with the holders H, and means for rotating the cans when they arrive near the rear end of the heating-table, substantially in the manner and for the purpose described.

4. In apparatus for soldering the end plates of sheet-metal cans to their can-bodies with solder applied in solid form, the combination of the metallic heating-table, means for heating said metallic table, the endless conveyer E, provided with the holders H, the supporting-way S, formed with the lower level $s$, rise $s'$, and upper level $s^2$, and the rails R, R, for rotating the cans, substantially in the manner and for the purpose described.

5. In apparatus for soldering the end plates of sheet-metal cans to their can-bodies with solder applied in solid form, the combination of the metallic heating-table, means for heating said metallic table, the endless conveyer E, provided with the holders H, formed with the presser-foot $h$, the supporting-way S, formed with the lower level $s$, rise $s'$, and upper level $s^2$, and the rails R, R, for rotating the cans, substantially in the manner and for the purpose described.

6. In apparatus for soldering the end plates of sheet-metal cans to their can-bodies with solder applied in solid form, the combination of the metallic heating-table, means for heating said metallic table, the endless conveyer E, formed with the holders H, the supporting-way S, and a traveling belt F, for rotating said cans by contact with the upper sides of their bodies during their passage over a portion of the heating-table, substantially in the manner and for the purpose described.

OLIN S. FELLOWS.

Witnesses:
GEORGE WILLIAM MIATT,
D. W. GARDNER.